United States Patent Office 2,839,537
Patented June 17, 1958

2,839,537

TRICYCLIC DIKETONE AND PROCESS OF MANUFACTURE

Karl Miescher, Riehen, Georg Anner and Peter Wieland, Basel, and Hellmut Ueberwasser, Riehen, Switzerland, assignors to Ciba Pharmaceutical Products, Inc., Summit, N. J.

No Drawing. Application May 6, 1953
Serial No. 353,426

Claims priority, application Switzerland May 12, 1952

5 Claims. (Cl. 260—340.9)

This invention relates to new tricyclic ketones of the formula

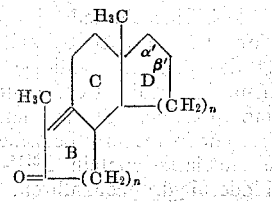

in which $n$ represents a whole number not greater than 2, and in which a free hydroxyl or oxo group, or a functionally converted hydroxyl group, e. g., ester group, or a functionally converted oxo group, e. g., an ethylene ketal group is present in the $\alpha'$-position or in which a double bond extends from the $\alpha'$-carbon atom to the $\beta'$-carbon atom. These compounds are of great value in the synthesis of steroids and steroid-like compounds. Thus, for example, diketones of the formula

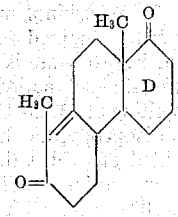

are valuable starting materials for the total synthesis of steroids, e. g. $\Delta^4$-3,17a-dioxo-D-homo-androsten.

The invention also embraces the process for preparing the novel compounds, as well as novel intermediates employed in the process.

According to this invention, tricyclic ketones are prepared by reacting a compound of the formula

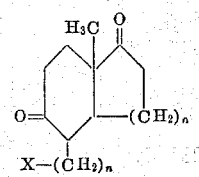

in which the oxo groups are protected, for example by conversion into ethylene ketal groups, and in which $n$ represents a whole number not greater than 2, and X represents a carbamyl group, for example, an N,N-dialkylcarbamyl group, with a metal ethyl compound, treating the reaction product with a hydrolyzing agent, and if desired, converting selectively an oxo group in the $\alpha'$-position into a functional derivative, or reducing it to a hydroxyl group, and/or splitting off an $\alpha'$-positioned free or functionally converted hydroxyl group with the formation of a double bond.

The reaction with a metal ethyl compound, especially one of the Grignard type, for example, an ethyl magnesium halide, such as ethyl magnesium bromide is advantageously carried out in an inert organic solvent such as an hydrocarbon or an ether.

The metal compounds formed in the first stage of the process, on treatment with the hydrolyzing agent, are decomposed, the protected oxo groups are converted into free oxo groups and ring formation takes place. Advantageously the treatment with hydrolyzing agents is carried out in stages. As hydrolyzing agents acids are preferably employed, such as mineral acids, for example, hydrochloric acid or sulphuric acid, or strong organic acids such as para-toluene sulphonic acid, or salts thereof with weak bases, such as ammonia or pyridine. In this manner protected oxo groups are simultaneously converted into free oxo groups. The ring formation may also take place simultaneously. Any open chain ketones so obtained may be subsequently subjected to ring closure, especially by means of alkaline agents such as sodium hydroxide.

In the tricyclic $\alpha{:}\beta$-unsaturated ketones so obtained an oxo group present in the $\alpha'$-position may be reduced by known methods to a hydroxyl group. There are suitable for the reduction, for example, light bimetal hydrides, such as lithium aluminum hydride or sodium boron hydride, or nascent hydrogen, for example, produced by means of sodium and alcohol, and also, for example, treatment with a carbinol, such as cyclohexanol or isopropyl alcohol, in the presence of an alcoholate such as aluminum tertiary butylate. Prior to the reduction the $\alpha{:}\beta$-unsaturated keto grouping can be protected, especially by conversion into an enol-ether.

It is also possible to convert selectively an oxo group in $\alpha'$-position of a tricyclic $\alpha{:}\beta$-unsaturated ketone into a ketal group, especially an ethylene ketal, the $\alpha{:}\beta$-unsaturated keto grouping remaining intact.

The splitting off of the free hydroxyl group with the formation of the double bond can be effected directly or indirectly. It can be done with the aid of agents which split off water or suitable procedures, such as heating. But it is also possible to convert the oxy compound into a functional derivative, such as an ester thereof. In order to form the double bond, acid is split out of the esters, e. g. by heating.

The bicyclic compounds used as starting materials are prepared as follows:

As starting materials there are used 5- or 6-membered alicyclic 1:3-diketones or 1-hydroxy-3-ketones, which contain in the 2-position a methyl group, or compounds which can be converted into such ketones by hydrolysis. These compounds are reacted with derivatives of 3-ketopentane or 3-keto-hexane which contain in the 1-position a halogen atom, or in the 1:2-position a carbon-to-carbon multiple bond and in the 5- or 6-position a functionally converted carboxyl group, for example, a carboalkoxy group. The resulting open chain compounds are subjected to ring closure to form $\alpha{:}\beta$-unsaturated bicyclic ketones. Then the double bond formed during ring closure is saturated with hydrogen. The oxo groups in the resulting products are protected, for example, by conversion into acetals, especially cyclic acetals, such as ethylene ketals. When the functionally converted carboxyl group in the compounds so obtained is other than a carbamyl group it is converted into a carbamyl, advantageously an N,N-dialkylcarbamyl group. The compounds so obtained have the formula given above. Of special importance are the dialkylamides of $\beta$-(1:6-dioxo-9-methyl-decalyl-5)-propionic acid, of which the oxo groups are converted into ethylene-ketal groupings, for example, of the formula

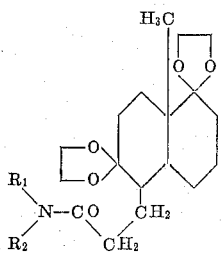

in which $R_1$ and $R_2$ represent alkyl groups, for example, lower alkyl groups, such as ethyl or methyl groups.

The following examples illustrate the invention, the parts being by weight unless otherwise stated, and the relationship between parts by weight and parts by volume being the same as that of the gram to the cubic centimeter:

Example 1

To a solution of ethyl magnesium bromide, prepared from 10 parts of magnesium and 50 parts of ethyl bromide, in 500 parts by volume of ether are added 128 parts of dimethylamide of β-(1:6-dioxo-9-methyl-decalyl-5)-propionic acid, of which the oxo groups are converted into ethylene-ketal groupings, of the formula

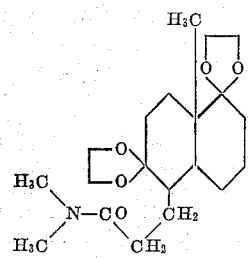

in 600 parts by volume of ether. The reaction solution is boiled, while stirring, for 4½ hours in a current of nitrogen. Decomposition is then brought about while cooling with a mixture of ice and sodium chloride and a mixture of 100 parts by volume of concentrated hydrochloric acid and 1000 parts by volume of water. After separating and evaporating the ethereal phase, the residue, after the addition of 1200 parts by volume of alcohol, is reunited with the aqueous hydrochloric acid solution. The mixture is then boiled for 2 hours under reflux. It is then diluted with saturated sodium chloride solution and extracted with ether. The residue from the ethereal solution after it has been washed with saturated sodium chloride solution and dried is allowed to stand overnight at room temperature under nitrogen with 55 parts of sodium hydroxide in 150 parts by volume of water and 1500 parts by volume of methyl alcohol. The whole is then mixed with saturated sodium chloride solution and water and extracted several times by agitation with ether. The ethereal solutions are washed in succession with saturated sodium carbonate solution and saturated sodium chloride solution, dried and evaporated. By recrystallizing the residue from ether there is obtained $\Delta^{8:14}$-8:11-dimethyl-1:7-dioxo-dodecahydrophenanthrene of the formula

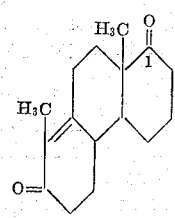

melting at 135.5–136.5° C. The same end product is obtained in an analogous manner by starting from the corresponding diethylamide.

The oxo group in the 1-position of the resulting diketone can be selectively reduced in the following manner:

0.5 part of $\Delta^{8:14}$-8:11-dimethyl-1:7-dioxo-dodecahydrophenanthrene, 0.5 part by volume of ortho-formic acid ethyl ester and 0.5 part by volume of 0.1 N-alcoholic hydrochloric acid are soaked for 15 minutes in a bath heated at 80° C. The mixture is then poured on to a saturated solution of sodium bicarbonate and rinsed with absolute ether. The ethereal solution is washed with saturated sodium chloride solution until neutral, dried and evaporated. The resulting crude enol-ether is dissolved in 10 parts by volume of ether and added, while stirring, in a current of nitrogen to 0.1 part of lithium aluminum hydride in 10 parts by volume of ether. After 15 minutes 4 parts by volume of water are added while cooling with ice and then 8 parts by volume of 2 N-sulphuric acid. The ethereal solution is separated, washed with saturated sodium chloride solution, dried and evaporated. For hydrolyzing the enol-ether, the residue is allowed to stand overnight at room temperature with 10 parts by volume of methanol and 0.5 part by volume of 2 N-hydrochloric acid. The whole is then diluted with saturated sodium chloride solution and extracted by agitation with ether. After washing the ethereal solutions, and drying and evaporating them, the residue is chromatographed over 15 parts of aluminum oxide. Small quantities of starting material are present in the first benzene fractions. The later benzene elutriates contain $\Delta^{8:14}$-1-hydroxy-7-oxo-8:11-dimethyldodecahydrophenanthrene of the formula

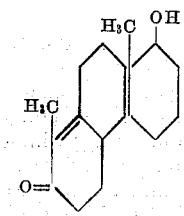

It melts at 133–134° C. after recrystallization from a mixture of ether and petroleum ether.

The stereoisomer of the carbinol melting at 133–134° C. described above can be obtained as follows:

1 part of aluminum isopropylate is added to a boiling solution of 1 part of $\Delta^{8:14}$-8:11-dimethyl-1:7-dioxo-dodecahydrophenanthrene melting at 135.5–136.5° C. in 50 parts by volume of absolute isopropyl alcohol. The isopropyl-alcohol is slowly distilled off whilst the mixture is boiled for 30 minutes. After cooling, adding ice and diluted hydrochloric acid it is shaken out with ether. The residue of the washed, dried and evaporated ethereal solution is chromatographed over aluminum oxide and recrystallized from a mixture of ether and petroleum ether. There is obtained $\Delta^{8:14}$-1-hydroxy-7-oxo-8:11-dimethyl-dodecahydrophenanthrene of the formula

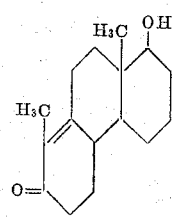

melting at 122.5–123° C.

The hydroxyl group can be removed from this carbinol by forming a double bond as follows:

To 0.55 part of the carbinol in 5 parts by volume of pyridine there is added while cooling with a mixture of ice and salt 0.5 part by volume of benzoyl chloride. After letting the mixture stand overnight at room temperature ice and ether are added. The ethereal solution is washed successively with dilute hydrochloric acid, water, dilute sodium carbonate solution and water, then dried and evaporated. The benzoate obtained is distilled under 0.02 mm. pressure at a bath temperature of 170°

C. 0.6 part by weight of the benzoate are distilled in a current of nitrogen through a glass tube heated to 300° C. The benzoic acid is thus split off. After dissolving the distillate in ether, the ethereal solution is washed successively with dilute sodium carbonate solution and water. The residue of the dried and evaporated ethereal solution is distilled under 0.02 mm. pressure at a bath temperature of 100–120° C. On adding petroleum ether there is obtained from the distillate the Δ$^{1:8:14}$-7-oxo-8:11-dimethyl-decahydrophenanthrene of the formula

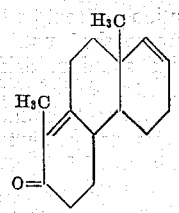

melting at 104–105° C.; λ max. 250 mμ (log ε=4.22).

The oxo group in α-position of the Δ$^{8:14}$-8:11-dimethyl-1:7-dioxo-dodecahydrophenanthrene with melting point at 135.5–136.5° C. can be converted into the ethylene ketal group in the following way:

A solution of 58 parts of the diketone mentioned and 0.6 part of p-toluene-sulphonic acid in 750 parts by volume of benzene and 15.5 parts of ethylene glycol is boiled for 4½ hours with the use of a water separator. It is then cooled, diluted with ether, washed in turn with dilute sodium bicarbonate solution and saturated sodium chloride solution, dried and evaporated. By chromatography of the residue over 30 times the quantity of aluminum oxide there is obtained from the fractions, which are extracted with a mixture of benzene and petroleum ether in a volume ratio of 1:4, the Δ$^{8:14}$-8:11-dimethyl-1:7-dioxo-dodecahydrophenanthrene of the formula

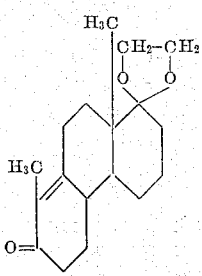

of which the oxo group in α'-position has been converted into the ethylene ketal group. It melts at 115–117° C. after redissolving from petroleum ether. λ max. 250 mμ (log ε=4.22).

From the remaining chromatogram fractions the tricyclic diketone used as starting material is recovered by boiling with dilute alcoholic aqueous hydrochloric acid.

The dimethylamide used as starting material and having the formula

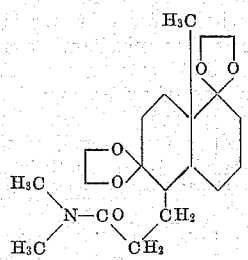

may be prepared, for example, as follows:

500 parts of glutaric acid monoethyl ester chloride are stirred into a mixture of 1000 parts of pulverized aluminum chloride in 1000 parts by volume of chloroform. The temperature is maintained between 18° C. and 21° C. by cooling. A powerful stream of ethylene gas is then introduced, if desired with the use of a distributing nozzle, which raises the temperature to 30–34° C. It is maintained within this range by moderate cooling. When the evolution of heat has subsided the whole is stirred for a further 12 hours at 30–20° C. in a feeble current of ethylene. For the purpose of working up the reaction mixture is poured while stirring into a mixture of 7000 parts of ice and 500 parts by volume of concentrated hydrochloric acid. After separating the aqueous phase and repeatedly extracting it with chloroform, the chloroform solution is washed in succession with 2 N-hydrochloric acid, ice-cold sodium carbonate solution and finally with sodium chloride solution, and then dried with sodium sulphate. After distilling off the chloroform under reduced pressure there is obtained a crude product, which consists mainly of 1-carbethoxy-6-chloro-hexane-4-one, a small amount of 1-carbethoxy-Δ$^5$-hexene-4-one and some glutaric acid diethyl ester, and which product is suitable without further purification for the following reaction.

475 parts of the crude product are stirred to form a magma with 320 parts of 1-methyl-cyclohexane-2:6-dione and 40 parts by volume of tertiary butanol, and triethylamine is added in portions of 30 parts by volume until heat is no longer liberated upon adding further triethylamine. By cooling a temperature of 50–55° C. is maintained. Depending on the composition of the crude chloro-keto-ester there are used for this purpose 200–300 parts by volume of triethylamine. In order to complete the reaction the mixture is finally heated for a further 10 minutes at 60° C. After cooling, ether is added to the reaction mixture and the crystalline constituents are separated from liquid constituents by filtration. From the crystalline portion there is recovered by washing with water the 1-methyl-cyclohexane-2:6-dione used in excess and unconsumed. The ethereal solution obtained by the filtration just described is washed in succession with a small amount of water, several times with sodium bicarbonate solution of 5 percent strength, 2 N-sulphuric acid, ammonium sulphate solution of 25 percent strength and then dried with sodium sulphate. By distillation there is obtained, after a small amount of forerunnings which consist mainly of glutaric acid diethyl ester, 1-methyl-1-(6'-carbethoxy-hex-3'-one-yl)-cyclohexane-2:6-dione of the formula

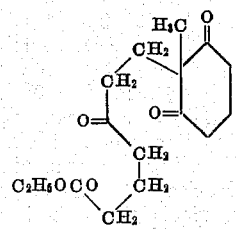

in the form of an almost colorless oil. It boils at 147° C. under 0.05 mm. pressure.

498 parts of 1-methyl-1-(6'-carbethoxy-hex-3'-one-yl)-cyclohexane-2:6-dione and 220 parts of benzoic acid are dissolved in 1800 parts by volume of xylene, 180 parts by volume of triethylamine are then added, the solution is heated to the boil, and the water formed is removed azeotropically. In order to separate the quantity of water theoretically set free by ring closure it is necessary to reflux for a period of 20–48 hours. Then the cooled xylene solution which may be diluted with ether is washed in succession with water, sodium bicarbonate solution of 5 percent strength, 2 N-sulphuric acid and water. From the dry solution there is obtained, after distilling off the xylene, β-(1:6-dioxo-9-methyl-Δ$^{5:10}$-octalyl-5)-propionic acid ethyl ester of the formula

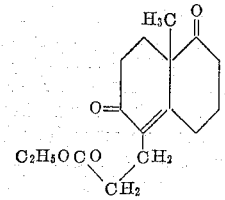

in the form of a slightly yellowish oil boiling at 135° C. under a pressure of 0.04 mm.

400 parts of this unsaturated ester are agitated with 8 parts of palladium black of 10 percent strength in 400 parts by volume of alcohol in an atmosphere of hydrogen at 40-42° C. In the course of 5-7 hours the quantity of hydrogen necessary for saturating the double bond is absorbed. After removal of the catalyst and the solvent, there is obtained β-(1:6-dioxo-9-methyl-decalyl-5)-propionic acid ethyl ester of the formula

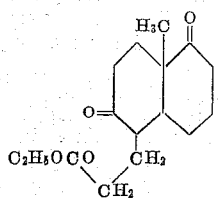

in the form of a colorless oil boiling at 132° C. under 0.03 mm. pressure. The product so obtained can be separated into stereoisomers as follows:

A solution of 300 parts of the above β-(1:6-dioxo-9-methyl-decalyl-5)-propionic acid ethyl ester in 1200 parts by volume of methyl alcohol and 1200 parts by volume of 1 N-caustic soda solution is allowed to stand at room temperature for 1 hour. The mixture is then heated for a further ¼ hour at 70° C. It is then mixed with 50 parts by volume of 1 N-hydrochloric acid and concentrated to a considerable extent by evaporation in a stream of nitrogen under reduced pressure produced by a water jet pump. The residue is mixed with 100 parts by volume of concentrated hydrochloric acid, saturated with sodium chloride, and extracted by agitation 5 times with chloroform. The combined chloroform extracts are dried and evaporated in vacuo. By taking up the residue in ether β-(1:6-dioxo-9-methyl-decalyl-5)-propionic acid crystallizes, and melts at 134-134.5° C. after recrystallization from ether. From the first mother liquors of the latter acid there crystallizes a mixture of acids which, after recrystallization from a mixture of acetone and ether, yields the isomeric acid melting at 123-124° C. The separation of the crystalline mixture of acids can be carried out more simply by direct esterification with diazo-methane followed by the crystallization from ether whereupon the pure methyl ester of the lower melting acid melting at 94-95° C., crystallizes directly. From the mother liquor there is obtained the methyl ester of melting point of 62.5-65° C. which corresponds to a third acid.

A suspension of 160 parts of the acid melting at 134-134.5° C. in 1000 parts by volume of ether and 250 parts by volume of methyl alcohol is mixed, while cooling with a mixture of ice and sodium chloride, with an ethereal solution of diazo-methane until all crystals have dissolved. After decomposing the excess of diazo-methane with glacial acetic acid the ethereal solution is washed with saturated sodium bicarbonate solution and saturated sodium chloride solution, dried and evaporated. By recrystallizing the residue from a mixture of ether and petroleum ether there is obtained the methyl ester of the higher melting acid melting at 64-66° C.

A solution of 168 parts of the methyl ester of the higher melting acid and 0.33 part of para-toluene sulphonic acid in 360 parts by volume of benzene and 110 parts of ethylene glycol is boiled with the use of a water separator for 5½ hours. The whole is then poured on to saturated sodium bicarbonate solution and saturated sodium chloride solution and extracted with ether. The ethereal solutions are washed until neutral with saturated sodium chloride solution, dried and evaporated. In order to hydrolyze the partially re-esterified carboxyl group the residue is allowed to stand overnight at room temperature with 1200 parts by volume of methyl alcohol and 350 parts by volume of 2 N-caustic soda solution. The whole is then concentrated by evaporation to a considerable extent in vacuo in a stream of nitrogen and then diluted with water and saturated sodium chloride solution. Glacial acetic acid is then added until the mixture turns litmus paper red and extracted with ether. The ethereal solutions are combined, dried, filtered and mixed while cooling with a mixture of ice and sodium chloride with diazo-methane until the yellow coloration persists. After decomposing the excess of diazo-methane with glacial acetic acid, the ethereal solution is washed with 2 N-sodium carbonate solution and saturated sodium chloride solution. After drying and evaporating, the resulting β(1:6-dioxo-9-methyl-decalyl-5)-propionic acid methyl ester, of which the oxo groups are converted into ethylene-ketal groupings, of the formula

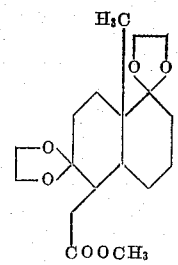

is distilled under 0.05 mm. pressure at 165° C. When decrystallized from a mixture of ether and petroleum ether it melts at 59-61° C.

The corresponding dimethylamide can be made in the following manner:

470 parts of dimethylamine and 2000 parts by volume of ether are added while cooling with ice to a solution of methyl magnesium iodide, prepared from 34 parts of magnesium and 216 parts of methyl iodide, in 1000 parts by volume of ether. After stirring for 1 hour while cooling with ice the ice bath is removed and the whole is mixed with a solution of 213.5 parts of the above diethylene-ketal compound in 1000 parts by volume of ether. The reaction solution is stirred for ½ hour at room temperature and then boiled for a further ¾ hour under reflux. The whole is then mixed, while cooling with ice, with a solution of 500 parts of ammonium chloride in 1500 parts by volume of water, and the aqueous phase is extracted several times with ether. The ethereal solutions are washed with saturated sodium chloride solution, dried and evaporated. In order to remove unreacted ester, the residue is allowed to stand with 500 parts by volume of methyl alcohol and 150 parts by volume of 2 N-caustic soda solution overnight at 0° C. 3000 parts by volume of saturated sodium chloride solution are then added and the whole is extracted by agitation with ether. The ethereal solution is washed in succession with a 2 N-sodium carbonate solution and saturated sodium chloride solution, dried and evaporated. The resulting dimethylamide of the formula

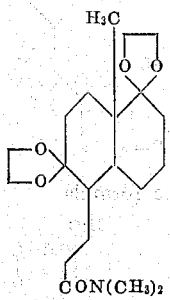

boils at 185° C. under 0.035 mm. pressure and melts at 105.5–106° C. From the alkaline portions unreacted starting material can be recovered by acidification with acetic acid, extraction with ether and esterification with diazo-methane.

The corresponding diethylamide of the formula

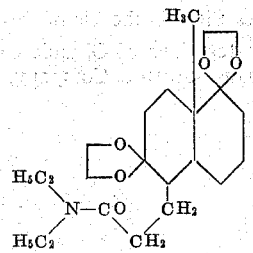

can be prepared as follows:

A methyl magnesium iodide solution is prepared from 1.4 parts of magnesium, 8.3 parts of methyl iodide and 35 parts by volume of ether, and there are added while cooling with ice 4.3 parts of diethylamine in 10 parts by volume of ether. After stirring for 30 minutes, while cooling with ice, the ice bath is removed and the whole is mixed with 12.3 parts of the diketal-methyl ester melting at 59–61° C. in 20 parts by volume of ether. The reaction solution is boiled for 25 minutes and then mixed with a saturated ammonium chloride solution while cooling with ice. The aqueous solution is extracted by agitation with ether several times, and then the ethereal solutions are washed with saturated sodium chloride solution, dried and evaporated. The residue is distilled in a high vacuum and then recrystallized from a mixture of ether and petroleum ether. The resulting diethylamide of β-(1:6-dioxo-9-methyl-decalyl-5)-propionic acid, of which the oxo groups are converted into ethylene-ketal groupings, of the formula

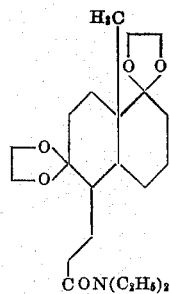

melts at 73–74° C.

This diethylamide melting at 73–74° C. can also be obtained by heating 5 parts of β-(1:6-dioxo-9-methyl-decalyl-5)-propionic acid melting at 134–134.5° C. with 20 parts by volume of toluene and 6 parts by volume of diethylamine in a closed vessel for 14 hours at 140° C., and then boiling 1 part of the resulting diethylamide boiling at 153° C. under 0.02 mm. pressure with 10 parts by volume of benzene, 0.57 part of ethylene glycol and 0.01 part of para-toluene sulphonic acid with the use of water separator for 4½ hours.

Example 2

A solution of ethyl magnesium bromide prepared from 12.3 parts of magnesium, 62 parts of ethyl bromide and 600 parts by volume of ether is mixed with 127 parts of dimethyl amide of the isomeric β-(1:6-dioxo-9-methyl-decalyl-5)-propionic acid described in Example 1, of which the oxo groups have been converted into the diethylene ketal group and which corresponds to the formula

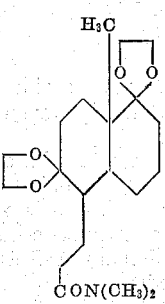

in 500 parts by volume of ether. The reaction solution is boiled in a current of nitrogen for 4½ hours. 1200 parts by volume of water and 120 parts by volume of concentrated hydrochloric acid are then added. After distilling off the ether and adding 1400 parts by volume of alcohol the whole is boiled for 2 hours in a current of nitrogen under reflux. 127 parts of caustic soda are added while cooling with ice, and stirred overnight in a current of nitrogen at room temperature. After adding hydrochloric acid till there is a feeble acid reaction, the alcohol is distilled off in vacuo. The residue is diluted with water and extracted several times with ether. The ethereal solutions are then washed in succession with dilute hydrochloric acid, dilute caustic soda lye and saturated sodium chloride solution. The residue of the dried and evaporated ethereal solutions is distilled in high vacuo. After crystallizing the portion boiling at 140–150° C., under 0.05 mm. pressure from a mixture of ether and petroleum ether there is obtained the stereoisomer $\Delta^{8:14}$-8:11-dimethyl-1:7-dioxo-dodecahydrophenanthrene described in Example 1 of the formula

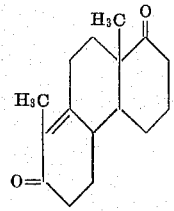

melting at 88–89° C.

The dimethylamide used as starting material can be obtained by analogous methods to Example 1 from the isomeric methyl ester of β-(1:6-dioxo-9-methyl-decalyl-5)-propionic acid melting at 94–95° C.

What we claim is:

1. A process for the manufacture of new tricyclic ketones wherein a compound of the formula:

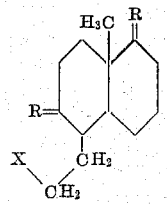

in which R represents a protected oxo-group and X stands for an N,N-disubstituted carbamyl group, is reacted with a Grignard ethyl metal compound and the reaction product treated with a hydrolyzing agent so as to produce a compound of the formula:

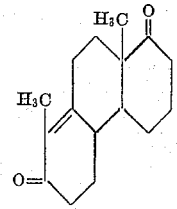

2. A process in accordance with claim 1, wherein the carbamyl group in the starting material is a N,N-di-lower alkyl-carbamyl group.

3. A process in accordance with claim 1, wherein a di-lower alkyl-amide of β-(1,6-dioxo-9-methyl-decalyl-5)-propionic acid in which the oxo groups are protected by ethylene ketal groups is employed as the starting material and $\Delta^{8:14}$-8:11-dimethyl-1:7-dioxo-dodecahydrophenanthrene is produced.

4. A diketone of the formula

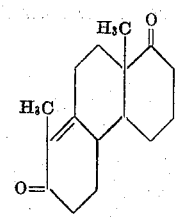

5. A ketone of the formula

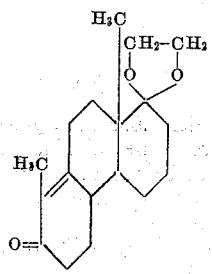

References Cited in the file of this patent

Hickinbottom: Reactions of Organic Compounds, 2nd ed., 1948, Longmans, Green & Company, p. 276.